US009456341B2

(12) United States Patent
Borg et al.

(10) Patent No.: US 9,456,341 B2
(45) Date of Patent: Sep. 27, 2016

(54) METHODS AND DEVICES FOR DERIVING A PERMANENT UE IDENTIFIER

(75) Inventors: Anette Borg, Stockholm (SE); Erik Friman, Stockholm (SE); Jari Vikberg, Järna (SE)

(73) Assignee: TELEFONAKTIEBOLAGET L M ERICSSON, Stockholm (SE)

( * ) Notice: Subject to any disclaimer, the term of this patent is extended or adjusted under 35 U.S.C. 154(b) by 106 days.

(21) Appl. No.: 14/352,504

(22) PCT Filed: Oct. 19, 2011

(86) PCT No.: PCT/SE2011/051249
§ 371 (c)(1),
(2), (4) Date: Apr. 17, 2014

(87) PCT Pub. No.: WO2013/058687
PCT Pub. Date: Apr. 25, 2013

(65) Prior Publication Data
US 2014/0287757 A1  Sep. 25, 2014

(51) Int. Cl.
H04W 8/26 (2009.01)
H04W 36/14 (2009.01)
H04W 36/00 (2009.01)

(52) U.S. Cl.
CPC ............... *H04W 8/26* (2013.01); *H04W 36/14* (2013.01); *H04W 36/0011* (2013.01)

(58) Field of Classification Search
CPC . H04W 24/08; H04W 8/02; H04W 36/0011; H04W 36/14; H04W 8/26
See application file for complete search history.

(56) References Cited

U.S. PATENT DOCUMENTS

2005/0221824 A1* 10/2005 Lee .................. H04W 36/0066
455/435.2
2008/0192697 A1* 8/2008 Shaheen ........... H04W 36/0061
370/331
2011/0044283 A1* 2/2011 Rubin .................... H04W 8/02
370/331

FOREIGN PATENT DOCUMENTS

WO  WO 2008/100488  8/2008
WO  WO 2011/019085  2/2011

OTHER PUBLICATIONS

International Search Report for International Application No. PCT/SE2011/051249, Jul. 23, 2012.
3GPP: "3rd Generation Partnership Project: Technical Specification Group Services and System Aspects; Circuit Switched (CS) fallback in Evolved Packet System (EPS); Stage 2 (Release 10)", Aug. 24, 2011.

(Continued)

*Primary Examiner* — Nam Huynh
(74) *Attorney, Agent, or Firm* — Patents on Demand P.A.; Brian K. Buchheit; Scott M. Garrett

(57) ABSTRACT

Network node and base station and methods therein for deriving a permanent identifier, such as an IMSI, for a UE in a cellular communication system of LTE type. The solution involves the use of a request for an inter-RAT handover, where the request comprises a temporary identifier of a process associated with the UE of which a permanent identifier is to be derived. The access to a permanent UE identifier is enabled in a radio access network where such an identifier is not readily available. The solution does not require any changes to procedures or nodes in the core network.

21 Claims, 12 Drawing Sheets

(56) References Cited

OTHER PUBLICATIONS

Nokia Siemens Networks et al; "Terms alignments and other misc. correction in 3GPP TS 23.272" 3GPP TSG-SA WG2 Meeting #67; Sophia Antipolis, France, Aug. 19, 2008.
3GPP: "3rd Generation Partnership Project; Technical Specification Group Services and System Aspects; General Packet Radio Service (GPRS) enhancements for Evolved Universal Terrestrial Radio Access Network (E-UTRAN) access (Release 10)", Aug. 24, 2011.
"3rd Generation Partnership Project; Technical Specification Group Radio Access Network; Evolved Universal Terrestrial Radio Access Network (E-UTRAN); S1 Application Protocol.(S1 AP) (Release 10)", Sep. 26, 2011.
"3rd Generation Partnership Project; Technical Specification Group Radio Access Network; UTRAN Iu interface Radio Access Network Application Part (RANAP) signalling (Release 10)", Sep. 26, 2011.
Qualcomm Europe: "Principles of Access Control for CSG Cells", 3GPP Draft; C1-083100, Aug. 11, 2008.

* cited by examiner

6:4: S1-EVO message X:{LTE Session, "Dummy Cell", "TLSI"}
6:6: Handover Required (Target= "Dummy Cell", "TLSI")
6:7: Forward Relocation Request (IMSI, Target= "Dummy Cell", "TLSI")
6:8: PS-Handover Request (IMSI, Target= "Dummy Cell", "TLSI")
6:10: PS-Handover Request-NACK (Reject Cause)
6:11: Forward Relocation Response (Reject Cause)
6:12: Handover preparation failure (Reject Cause)

8:6: Handover Required(Target= "Dummy Cell", "TLSI")
8:7: Forward Relocation Request (IMSI, Target= "Dummy Cell", "TLSI")
8:8: PS-Handover Request (IMSI, Target= "Dummy Cell", "TLSI")
8:10: PS-Handover Request-NACK (Reject Cause)
8:11: Forward Relocation Response (Reject Cause)
8:12: Handover preparation failure (Reject Cause)

METHODS AND DEVICES FOR DERIVING A PERMANENT UE IDENTIFIER

PRIORITY

This nonprovisional application is a U.S. National Stage Filing under 35 U.S.C. §371 of International Patent Application Serial No. PCT/SE2011/051249, filed Oct. 19, 2011 and entitled "Methods and Devices for Deriving A Permanent UE Identifier."

TECHNICAL FIELD

The invention relates to the deriving of a permanent UE identifier in a cellular communication system of LTE type.

BACKGROUND

Caching in mobile networks is a relatively well known technology. Caching utilizes the fact that a large percentage of Internet traffic is repetitive, and eliminates the need for repeating content all the way from its origin, which may save time and resources. The main principle of caching is that copies of frequently requested content in e.g. the Internet is moved from the origin and stored closer to the mobile users, for example in different parts of the RAN (Radio Access Network), in the CN (Core Network) or just above the CN.

The main benefits that can be achieved with caching in mobile networks are:

The cost of transport in the mobile network above the cache may be decreased, since the cached information, in principle, is only transferred once in the transmission links above the cache. i.e. from the origin to the cache.

The QoE (Quality of Experience) for the mobile end-users may be improved, e.g. by reduced delays. The reduced lower delays are achieved as the cached information can be returned faster to the mobile users from the cache, as compared to if the information would have been retrieved all the way from the original location.

There will be opportunities for the operators to provide new services, such as content hosting and storage/backup. For example, a mobile operator can sign agreements with one or more content providers, according to which the mobile operator ensures that the content from these specific content providers will be delivered in a better way to the mobile users in the mobile operator's network.

Consequently, caching can be used for media distribution towards mobile users as an alternative to retrieving downloadable media from a more remote media server or from other users, by that the media is retrieved from the cache. FIG. 1 shows how media information from a media server is pushed into a cache in a mobile network, and how the mobile users receive the information directly from the cache instead of from the media server. It is also worth mentioning that caching can be used for almost any internet content and that FIG. 1 is just an example based on media services.

One important component of caching is packet inspection, which is performed in order to identify if a content request is related to information which is already stored in the cache or if the content can be saved in the cache when it is being forwarded to the client requesting the content. Packet inspection may be seen as a first natural step towards full Deep Packet Inspection (DPI) in the RAN. The use of DPI in the RAN enables collection of information related to the content of the packets, which may be used for so-called learning user profiling or subscriber profiling over longer periods of time and between different sessions. The RAN becomes aware of the different services used by the end users by using DPI in the RAN, and this is the definition of the Service Aware RAN. One important aspect of the user profiling is to store information about the different services used by the different end users.

FIG. 4 shows an illustrative example of Service Aware RAN for E-UTRAN/LTE, WCDMA/HSPA and GSM/GPRS/EDGE. In the figure a Service Aware RAN function is shown as a common component for all three RATs. It can be based on PS user plane made to traverse via this function and then, for example, identifying the different services based on packet inspection/DPI An important component for the user profiling is the access to a permanent UE identifier, which enables tracking of the activities of a certain user/UE. In this document, the term permanent UE identifier is used for both mobile subscription identifiers for the subscription used on a UE and for UE identifiers. Examples of such permanent UE identifiers are e.g. IMSI (International Mobile Subscriber Identity), IMEI (International Mobile Equipment Identity), IMEISV (International Mobile station Equipment Identity and Software Version Number) and MSISDN (Mobile Subscriber Integrated Services Digital Network Number). The permanent UE identifier is needed as it, in combination with packet inspection/DPI, enables building of databases over for example:

user service pattern—e.g. what is the user doing?
user geographic locations—e.g. where is the user doing whatever she/he is doing?
user specific time patterns—e.g. when is the user going to do it?

It may be desirable to perform such user profiling at all times when a user is active in a communication network. For example, it may be desirable to perform user profiling of a user also when she/he moves between systems using different Radio Access Technologies (RATs), such as e.g. GSM/GPRS/EDGE, WCDMA/HSPA and LTE. FIG. 2 shows an exemplary network with three different RATs.

As previously stated, a UE user (SIM card) is uniquely identified by the IMSI number. In a scalable, learning, adaptive and Service Aware RAN, the possibility to track performance over time related to a specific user requires that a long term unique identifier is available in the RAN.

In a short time perspective, introducing or moving e.g. Legal Intercept (LI) and charging functionality in or into SA-RAN, would require that the IMSI is detected in the RAN. The motivator for moving down LI from the core network to RAN would be that operators may have the core network nodes in one country and the RAN in another country, and that LI has to be performed within the country in which the LI is ordered.

The LI function identifies a UE to be intercepted with an IMSI. The user activities in terms of downloads and internet accesses need to be reported to the LI organization. In a scenario where a cache is located in a RAN and the LI function is interfaced via the core network (as of today) the content which is played out from the cache need to be uniquely associated with/connected to an intercepted UE, in order to enable reporting of the correct information to the LI function.

Another situation where a permanent UE identifier may be desired could be when there is a need for developing RAN policies, or a set of rules, in RAN that is applicable to a unique UE. The development of such policies or rules would require that IMSI is detected in the RAN. An example of such a rule could be that a certain UE is excluded or barred from using a RAN cache or other RAN unique services. Another example of a RAN policy could be that a certain user should have his/her content accelerated via services located in a RAN cloud.

A further reason for desiring access to a permanent UE identifier in a RAN is subscriber profiling, as mentioned above, to enhance how the services are delivered in RAN. One example situation where a user could benefit from user profiling is e.g. when every week day, the user takes a bus to work, every day at approximately the same time of day, the bus drives in to a long tunnel with unfavorable radio conditions, and the user is thus out of radio coverage for 2 minutes. Geographic information identifying the cell with the tunnel and an intelligent selection of content, e.g. the news paper that is read every day or the remaining part of the film that is streamed, could be used to trigger a pre-download of content to the subscriber, and thus anticipate and minimize the impact of the loss of coverage in the tunnel.

The different permanent UE identifiers are defined in 3GPP TS 23.003. The definition of IMSI is also illustrated in FIG. 3. The IMEISV, IMEI and the MSISDN will not be further described in this disclosure.

As illustrated in FIG. 3, the IMSI is composed of three parts:
  Mobile Country Code (MCC) consisting of three digits.
    The MCC identifies uniquely the country of the mobile subscriber.
  Mobile Network Code (MNC) consisting of two or three digits. The MNC identifies the home PLMN (Public Land Mobile Network) of the mobile subscriber. The length of the MNC (two or three digits) depends on the value of the MCC.
  Mobile Subscriber Identification Number (MSIN) identifying the mobile subscriber within a PLMN.
    The National Mobile Subscriber Identity (NMSI) consists of the MNC and the MSIN.

However, there is at least one problem which needs to be resolved in order to achieve the services described above for all RATs, and that is the fact that there is no permanent UE identifier available in certain RANs such as e.g. in E-UTRAN/LTE. Instead, a temporary identity, such as e.g. S-TMSI (System Architecture Evolution-Temporary Mobile Station Identity), is used when the UE communicates with the network. Further, the temporary identity gets re-assigned frequently.

The reason for not allowing permanent UE identifiers in certain RANs is that it has been considered as a risk for personal integrity to have identifiable information of user activities in base stations, such as eNBs, since the security of these nodes cannot be guaranteed. For example, base stations can be placed in insecure environments or sites. Further, base stations sites are normally not manned with operator personnel and therefore the threat for someone breaking into a base station is higher, as compared to for example an RNC (Radio Network Controller) site for WCDMA (where IMSI is available). Further, the so-called femto base station or Home eNB (HeNB) in LTE (Long Term Evolution) has the same architecture as a macro eNB, and if IMSI would be made available in eNBs, then it would also be available in HeNBs that can be placed almost anywhere.

If e.g. IMSI would be made available in base stations, such as eNBs or HeNBs, and someone would illegitimately break into such a base station, this someone would possibly be able to access information on exactly which terminals that were attached to the base station and to track these terminals and the actions of their users.

Thus, in the LTE case, the different permanent UE identifiers like IMSI, IMEI, IMEISV and MSISDN are only known in the core network, i.e. in the EPC (Evolved Packet Core) (and not in the access network). In the LTE RAN, different temporary identifiers are used. For WCDMA/HSPA and GSM/GPRS/EDGE, IMSI is already made available in BSC/RNC.

One solution to the above described problem would be to modify the LTE core network, EPC, e.g. the MME, to support delivery of permanent UE identifiers to eNBs in E-UTRAN/LTE. Such an approach is described in the document WO2011/019085. However, such modifying of the LTE core network is not desired, e.g. due to the above reasons related to user identity confidentiality in the base stations.

SUMMARY

It would be desirable to have access to a permanent UE identifier in radio access networks where no such permanent identifier is readily available today, such as radio access networks of LTE type. It is an object of the invention to enable access to a permanent UE identifier in such a radio access network.

According to a first aspect, a method is provided in a network node for deriving a permanent identifier for a UE in a cellular communication system of LTE type. The method comprises triggering a transmission of a first message requesting an Inter-Radio Access Technology (Inter-RAT) handover, where the first message comprises a temporary identifier, identifying a session of the UE. The method further comprises receiving a second message in response to the first message, where the second message comprises a permanent identifier and the temporary identifier identifying a session of the UE. The method further comprises deriving a permanent identifier for the UE by creating an association between the session identified by the temporary identifier and the permanent identifier, comprised in the second message.

According to a second aspect, a network node is provided for deriving a permanent identifier for a UE in a cellular communication system of LTE type. The network node comprises a processing circuit configured to trigger a transmission of a first message requesting an Inter-RAT handover, where said first message comprises a temporary identifier identifying a session of the UE. The network node processing circuit being further configured to receive a second message in response to the first message, where said second message comprises a permanent identifier, and the temporary identifier identifying a session of the UE. The network node processing circuit being further configured to derive a permanent identifier for the UE by creating an association between the session identified by the temporary identifier and the permanent identifier comprised in the second message.

The above method and network node may be used for enabling access to a permanent identifier, such as an IMSI, in radio access networks where no such permanent identifier is readily available today. When derived, the permanent UE identifier could be used e.g. for saving information for so-called user profiling. The access to a permanent UE identifier is enabled without any modification of procedures or nodes in the core network.

The above method and network node may be implemented in different embodiments. The first message further comprises an identifier of a handover target cell and/or node, which is selected such that the Inter-RAT handover is requested to be performed towards the network node itself. In some embodiments, the permanent identifier is the International Mobile Subscriber Identity, IMSI, of the UE. The IMSI is the permanent UE identifier which is inserted to Inter-RAT handover preparation signaling by a core node in LTE type systems today.

In some embodiments, the temporary identifier is a Temporary LTE Session Identifier (TLSI). Further, the target cell for the requested handover may be a dummy cell, which is configured in the cellular communication system, where the dummy cell is associated with the network node. The use of a dummy cell has at least the advantage of that it is easy to separate the handover requests related to deriving a permanent UE identifier from conventional handover requests. The Inter-RAT handover request may be rejected in order to prevent further activity related to the requested handover. Thus, unnecessary waste of resources may be avoided.

The rejecting of the request for Inter-RAT handover could involve e.g. rejecting based on detection of a special predefined handover cause in the second message and/or rejecting with a special reject cause, where the special causes indicate that the request and/or reject is associated with the derivation of a permanent UE handover. The use of such special causes facilitates e.g. the decision to reject the handover request and the separation of this special type of handover request in the statistics of handover requests and rejected handover requests.

Further, the temporary identifier may be comprised/inserted in a Transparent Container in the first and second message. This could be a convenient way to convey the temporary identifier to the target node. The first message could be transmitted to a Mobility Management Entity (MME), and it could be transmitted by the network node or by a base station serving the UE. In case the first message is sent by the base station serving the UE, the triggering of a transmission of the first message involves ordering the base station serving the UE to transmit the first message. The handover target cell may be associated with a 3G and/or 2G communication system, such as e.g. WCDMA and/or GSM, and the network node may comprise RNC and/or BSC (Base Station Controller) functionality. Further, the network node may be associated with a communication system of LTE type, and be served by an eNB.

According to a third aspect, a method is provided in a base station for supporting deriving of a permanent identifier for a UE being served by the base station. The method comprises receiving an indication comprising a temporary identifier identifying a session of the UE. The method further comprises transmitting, in response to said indication, a first message requesting an Inter-RAT handover, where said first message comprises the temporary identifier.

According to a fourth aspect, a base station is provided for supporting deriving of a permanent identifier for a UE being served by the base station. The base station comprises a processing circuit configured to receive an indication comprising a temporary identifier identifying a session of the UE. The base station processing circuit being further configured to transmit, in response to said indication, a first message requesting an Inter-RAT handover, where said first message comprises the temporary identifier.

The method in a base station and the base station may be used for enabling access (in a network node) to a permanent identifier, such as an IMSI, in radio access networks where no such permanent identifier is readily available today. When derived, the permanent UE identifier could be used e.g. for saving information for so-called user profiling. The access to a permanent UE identifier is enabled without any modification of procedures or nodes in the core network.

The method in a base station and the base station may be implemented in different embodiments. The indication further comprises an identity of a cell and/or node, which identity is to be included in the first message as indicator of the target cell and/or node for the requested Inter-RAT handover. In some embodiments, the first message further comprises a specific handover cause, which indicates that the request for handover is related to derivation of a permanent UE identifier. In some embodiments, the temporary identifier is inserted in a transparent container in the first message. The advantages of the use of such a handover cause and/or a transparent container are described above.

The embodiments above have mainly been described in terms of a method. However, the description above is also intended to embrace embodiments of the network node and base station, configured to enable the performance of the above described features. The different features of the exemplary embodiments above may be combined in different ways according to need, requirements or preference.

BRIEF DESCRIPTION OF THE DRAWINGS

The invention will now be described in more detail by means of exemplifying embodiments and with reference to the accompanying drawings, in which.

DETAILED DESCRIPTION

Briefly described, a permanent identifier of a UE is made available in a RAN of a cellular communication system of LTE type, where it previously has not been available, such as the LTE part of a Service Aware Radio Access Network (SA-RAN). By the expression cellular communication systems of LTE type is meant systems based on the LTE standard, such as LTE, LTE-A or further developments thereof. Examples of such further developed communication systems may typically be of so-called flat architecture type, where core network nodes have a direct signaling interface to base stations.

The SA-RAN is a RAN that is aware of the different services used by the end users. An important aspect of SA-RAN is user profiling and the permanent identifier is needed for the purpose to be able to perform user profiling over longer periods of times, for example between different sessions created by one end user. The permanent identifier is made available based on using existing handover signaling triggered from the RAN. When a permanent UE identifier for a UE session or EPS bearer (Evolved Packet System) in the LTE part of a SA-RAN needs to be resolved, a handover preparation phase is triggered towards either GSM/GPRS/EDGE or WCDMA/HSPA part of the same SA-RAN function. This results in the core network sending out the IMSI to the SA-RAN and specific information contained in the handover preparation signaling can be used to associate the IMSI with the UE session or EPS bearer and thus with the information associated with said UE session or EPS bearer.

Figure 1:
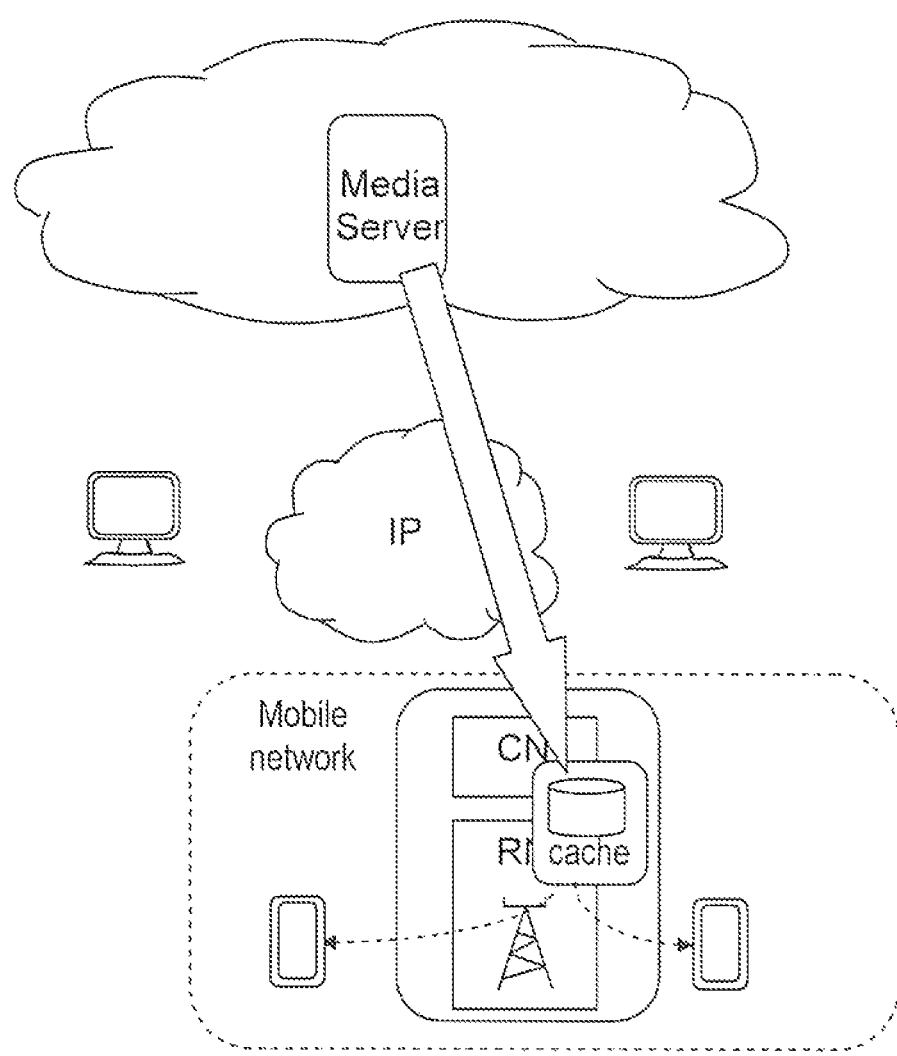
FIG. 1 is a schematic view illustrating caching.
Figure 2:
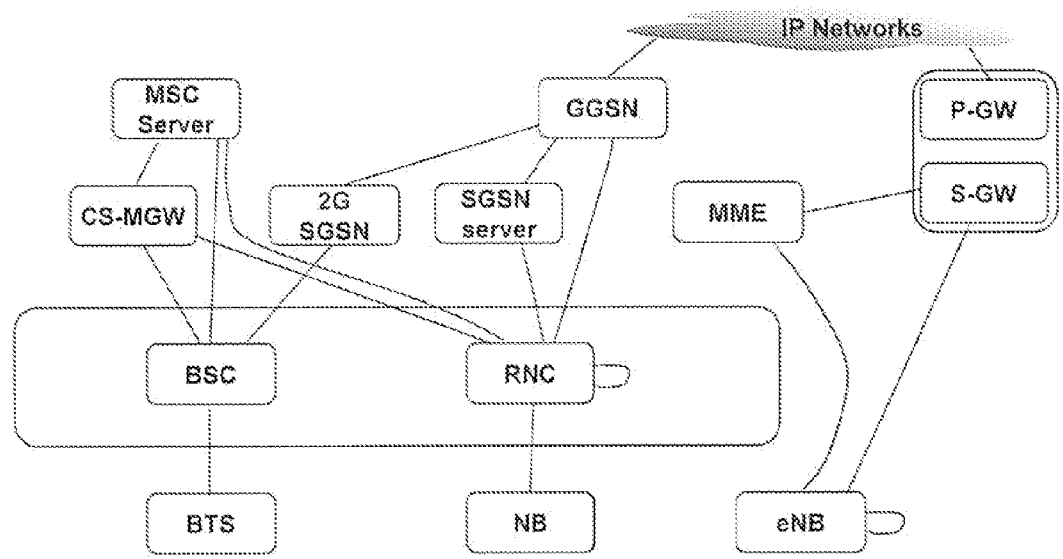
FIG. 2 is a schematic view illustrating an exemplary network comprising three different RATs.
Figure 3:
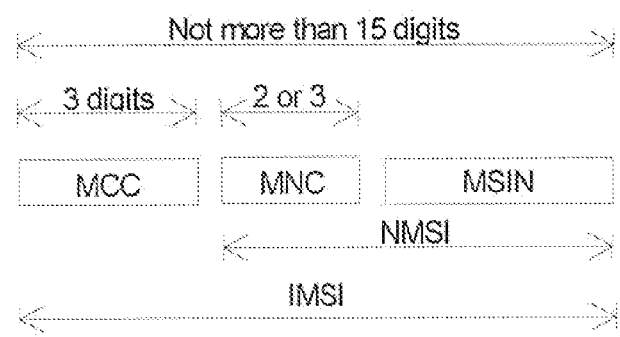
FIG. 3 illustrates the different components of an IMSI.
Figure 4:
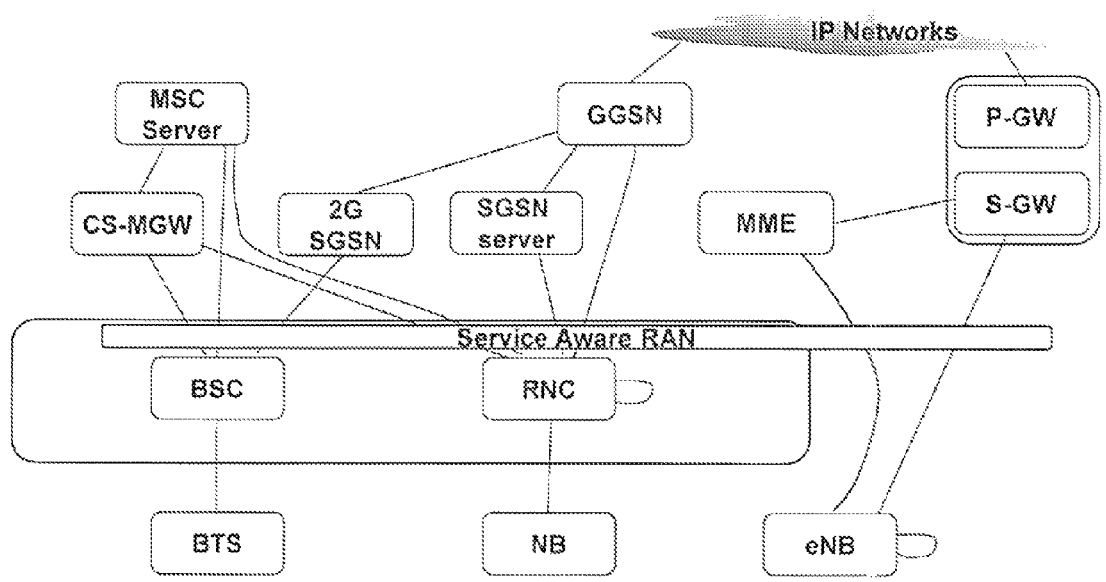
FIG. 4 is a schematic view illustrating a Service Aware RAN for three RATs.
Figure 5:
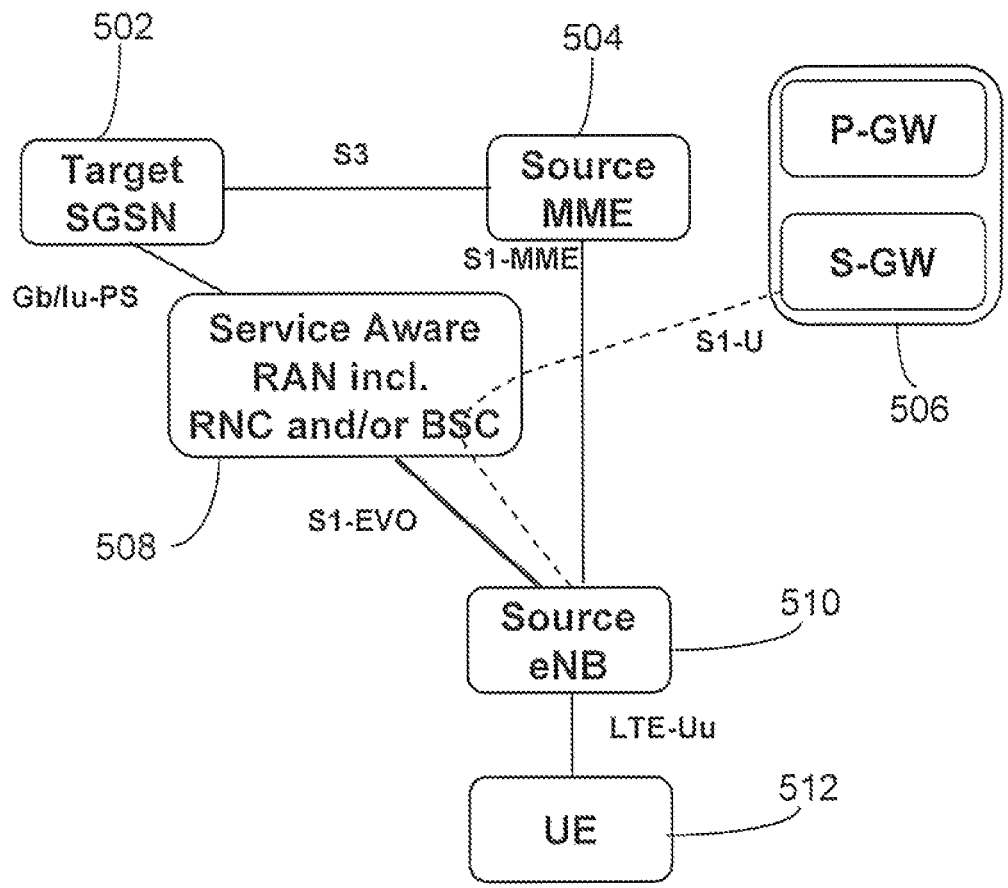
FIG. 5 is a schematic view illustrating an exemplary network in which embodiments of the invention may be applied.
Figure 7:
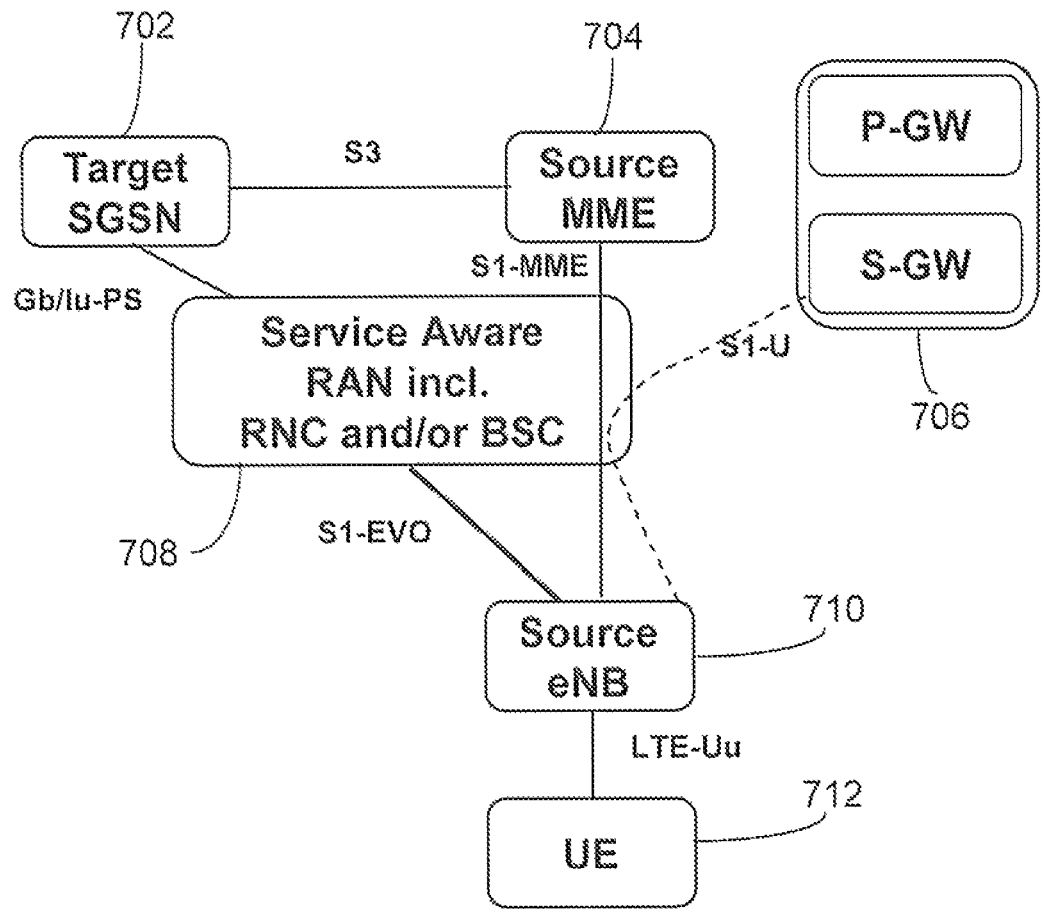
FIG. 7 is a schematic view illustrating an exemplary network in which embodiments of the invention may be applied.

An EPS bearer consists of a radio bearer between a UE and an eNB, an S1 bearer between the eNB and a Serving GW, and an S5/S8 bearer between the Serving GW and PDN-GW (Serving GateWay/Packet Data Network GateWay) (P-GW in FIGS. 5 and 7).

The source side (i.e. the LTE part of the SA-RAN) selects or creates a temporary identifier for the EPS bearer or session, which identifier thus is associated with a session of the UE for which a permanent identifier is to be resolved. The temporary identifier may be inserted or included in a RAN Transparent Container, which is a defined part of a handover preparation request. The source side also selects a handover target cell, such as e.g. a GSM or WCDMA cell, which cell is controlled by the same SA-RAN. This means that the SA-RAN (function) also contains parts of RNC and/or BSC functionality. The minimum RNC and/or BSC functionality needed is related to the Inter-RAT handover preparation signalling as described in this disclosure. For example, the SA-RAN includes support for the Iu-PS or Gb interfaces (for the case of WCDMA and GSM), and more precisely at least the Inter-RAT handover preparation signalling parts of these interfaces.

The target cell should be selected such that it is a cell that is associated with a non-LTE part of the SA-RAN. The target cell may be a cell created only for the purpose of the method described in this disclosure, or it may be an existing cell. The target cell is selected so that the core network will route the handover request back to the same node. In case when Inter-RAT handover signaling towards WCDMA/UTRAN is used this means that the RNC Identity (RNC-ID) of the selected target UTRAN cell is used by the core network to route the handover signaling. In case when Inter-RAT signaling towards GSM/GPRS/EDGE is used this means that the Cell Global Identity (CGI) of the selected target GERAN cell is used by the core network to route the handover signalling. The handover preparation request is routed by the source MME to the target SGSN, connected to the target RNC or BSC controlling the target cell. The source MME adds/includes the IMSI in the signaling, according to standard procedure. Finally SGSN forwards the handover request to the target RNC or BSC, and the IMSI is also included in the handover request. The handover request also contains the temporary identifier selected or created by the source side. Now, as both the source and target sides are really parts of the same node/function, i.e. the SA-RAN, the temporary identifier selected for the EPS bearer can be used to find the IMSI for this session and for associating the session with the IMSI, thus deriving a permanent UE identifier for the UE associated with the session (or, strictly, for the SIM card in the UE).

Preferably, the request for handover should be rejected when the goal of obtaining a permanent UE identifier is fulfilled or as soon as possible after that, in order to save resources. There are different variants for how the handover preparation may be handled and which actions that may be taken, for example, one or more of the following:

The handover preparation phase is rejected with a special/new reject cause, which could be denoted e.g. UE identity HO reject, which indicates that the rejection is related to derivation of a permanent UE identifier.

The handover preparation is triggered only for a signaling bearer, i.e. the control plane and not the user plane, in order to result in as few actions in the core network as possible.

A special/new handover cause is used in the handover preparation signaling for statistical purposes, in order to differentiate this signaling from conventional handover preparation signaling. This new handover cause should indicate that the request for handover is related to derivation of a permanent UE identifier, and could e.g. be denoted UE identity.

A special/new handover reject cause, which indicates that the reject is related to permanent UE derivation activity is used in the handover preparation reject signaling for statistical purposes, in order to differentiate this signaling from signaling related to conventional handovers, which are rejected e.g. due to congestion.

FIG. 5 shows an example of a network comprising network nodes associated with different RATs. The network example is simplified and only shows a subset of all possible network nodes. A UE 512 is shown, which is connected to an eNB 510 that has a signaling connection for the UE towards an MME (Mobility Management Entity) 504 over the S1-MME signaling interface. Further, the UE 512 has an active EPS session, illustrated as a dashed line from the eNB, which session is anchored via a Service Aware RAN 508 towards the S-GW/PDN-GW 506. The eNB 510 has a new S1-EVO (Evolved S1) interface towards the Service Aware RAN node/function 508 that also may contain e.g. either RNC or BSC or both. The RNC and BSC parts are further connected to the SGSN 502 in the core network over Iu-PS (RNC) or Gb (BSC) interfaces. The S1-EVO interface consists of functionality to make the S1-U interface that normally traverses directly between the eNB and the S-GW to instead traverse also via the SA-RAN node/function. Other S1-EVO related functionality is described in this disclosure, for example how the SA-RAN node/function triggers the eNB to initiate the Inter-RAT handover preparation phase for the purpose of deriving the permanent UE identifier for the end user in question.

Figure 6:
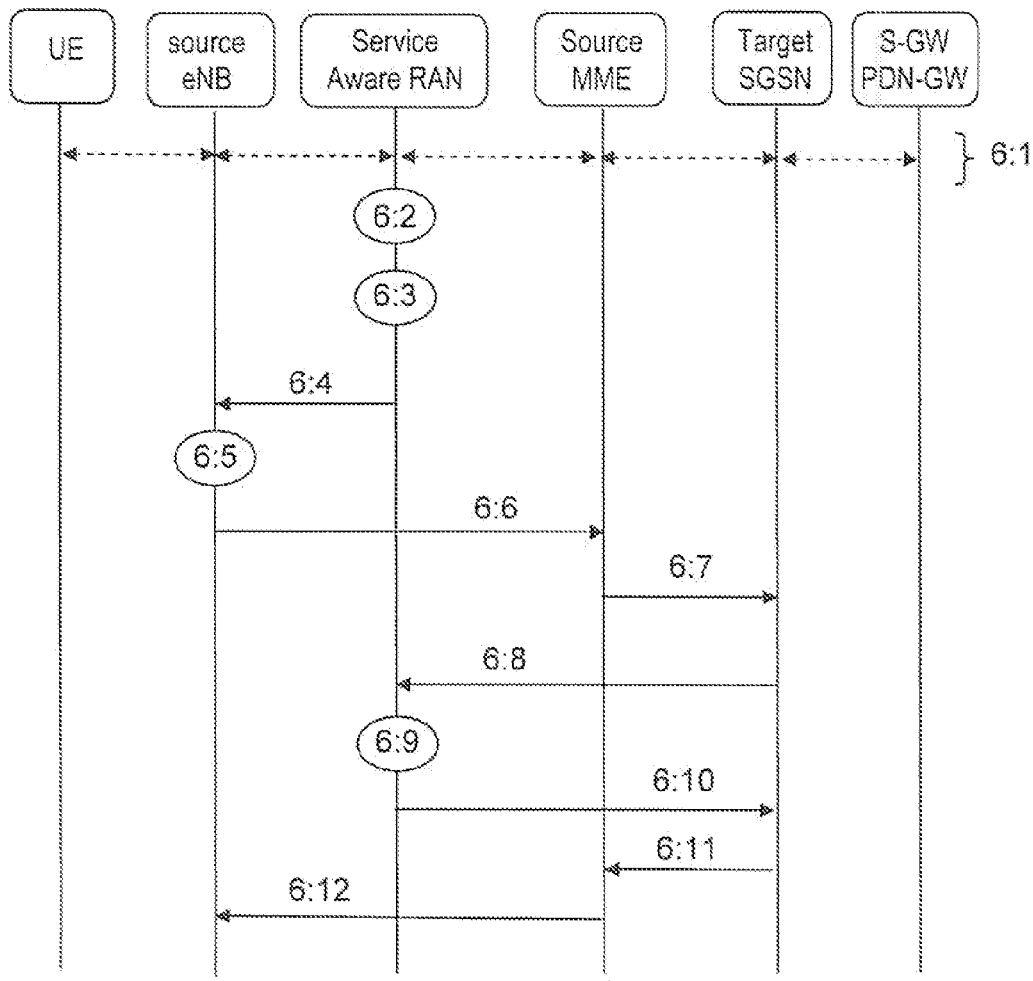
FIG. 6 is a signaling chart illustrating the signaling when applying an exemplifying embodiment of the invention in the network illustrated in FIG. 5.

FIG. 6 illustrates an exemplifying signaling scheme or scenario between the nodes illustrated in FIG. 5, in accordance with an exemplifying embodiment. The main actions shown in FIG. 6 are the following:

6.1. The UE is served by the eNB and active in an EPS session that is anchored via the Service Aware RAN (SA-RAN) towards the S-GW/PDN-GW.

6.2. It is desired in the SA-RAN to resolve or derive a permanent UE identifier for the UE, which is active in LTE RAN, where no permanent UE identifier is available, (as opposed to e.g. in WCDMA and GSM RANs).

The permanent or inter-system-unique identity of the UE having the EPS-session is thus unknown to the SA-RAN.

6.3. The SA-RAN selects: a) a local GSM or WCDMA cell as a handover target cell and b) a temporary identifier of the session of the UE, e.g. a TLSI (Temporary LTE Session Identifier).

6.4. The SA-RAN uses the new S1-EVO interface towards the eNB to indicate that it is desired to resolve or derive the permanent UE identifier for the UE involved in the session, where the UE is indicated to the eNB in some suitable way. The SA-RAN can for example use the S1-U identifiers to indicate the intended UE. The SA-RAN includes an identity of the selected target cell and the TLSI in the new S1-EVO message.

6.5. The message in step 6.4 is seen by the eNB as an instruction or trigger to initiate a faked handover preparation towards the indicated target cell by creating a handover request message (Handover Required). In this message, the eNB includes the received TLSI in a RAN Transparent Container towards the selected target cell.

6.6. The eNB sends the Handover Required message towards the MME on a signaling connection associated with the intended UE. The RAN Transparent Container is included in the message.

6.7. The (source) MME forwards the handover preparation request to the target SGSN using known methods. The IMSI of the UE, or rather of the SIM card in the UE, is also included in the signaling and the RAN Transparent Container is forwarded unmodified.

6.8. The target SGSN forwards the handover preparation request towards the RNC or BSC handling the indicated target cell. The IMSI is also included in the signaling and the RAN Transparent Container is forwarded unmodified. FIG. 6 shows an example of BSC signaling as a PS-HANDOVER-REQUEST message being sent from the SGSN to the BSC part of SA-RAN. In the RNC case the message would be called RELOCATION REQUEST (from the SGSN to the RNC).

6.9. The SA-RAN receives the handover preparation request (in its role as RNC or BSC for the handover target cell). Now the SA-RAN has access to a message comprising both the IMSI of a UE and a TLSI of a session associated with the same UE. Thus, the SA-RAN uses the TLSI included in the received RAN Transparent container to identify the associated EPS session associated with the UE. As the IMSI is also included in the message, the SA-RAN resolves the IMSI for the UE active in LTE and creates a connection or association between the EPS-session associated with the UE in question and the IMSI. The IMSI may now be used by the SA-RAN e.g. when storing information related to the EPS-session e.g. for user profiling purposes. As the handover preparation now has served its purpose the SA-RAN decides to reject the handover preparation phase.

6.10. SA-RAN signals back to the SGSN that the handover preparation phase was rejected. FIG. 6 shows the example of BSC signaling, where such a rejection is indicated by a PS-HANDOVER-REQUEST-NACK message being sent from the BSC part of SA-RAN to the SGSN. In the RNC case the message would instead be called RELOCATION FAILURE (from RNC to the SGSN).

6.11. SGSN forwards the results to the source MME.

6.12. Source MME forwards the result back to the eNB.

Figure 8:
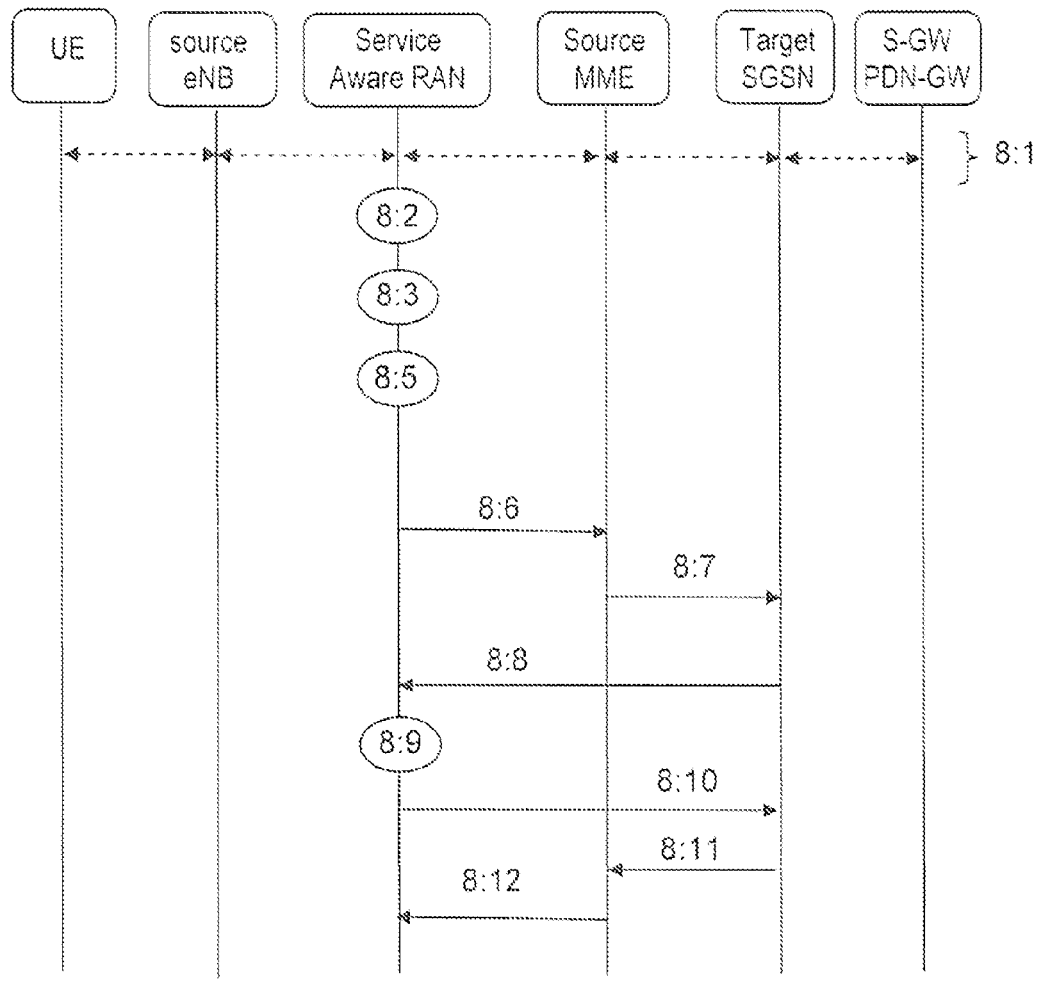
FIG. 8 is a signaling chart illustrating the signaling when applying an exemplifying embodiment of the invention in the network illustrated in FIG. 7.

Another variant of the above described embodiment may be applied when the S1-MME interface between the eNB and the MME also traverses via the SA-RAN function/node, as is shown in FIG. 7. The signaling flow for this case is shown in FIG. 8. In this embodiment, the steps 4, 5 and 6 are different as compared to the signaling described in conjunction with FIG. 6, as follows. Since the communication between the eNB and MME traverses the SA-RAN, which has access to the signaling, the SA-RAN may include information in the signaling and it may create new signalling on the S1-MME interface. Thus, the SA-RAN may trigger the handover preparation without contacting the eNB at all. This means that step 6.4 in FIG. 6 (which would have been 8.4 in FIG. 8) is not required in this case. Step 8.5 and step 8.6 (corresponding to 6.5 and 6.6) are performed by the SA-RAN, meaning that the Handover required message is sent from the SA-RAN towards the MME instead of from the eNB, as previously described in conjunction with FIG. 6. In a corresponding manner, the response in step 8.12 from the MME is received and handled by the SA-RAN (instead of the eNB as in FIG. 6). Thus, in this embodiment, the eNB is not involved in the deriving of a permanent UE identifier.

Figure 9:
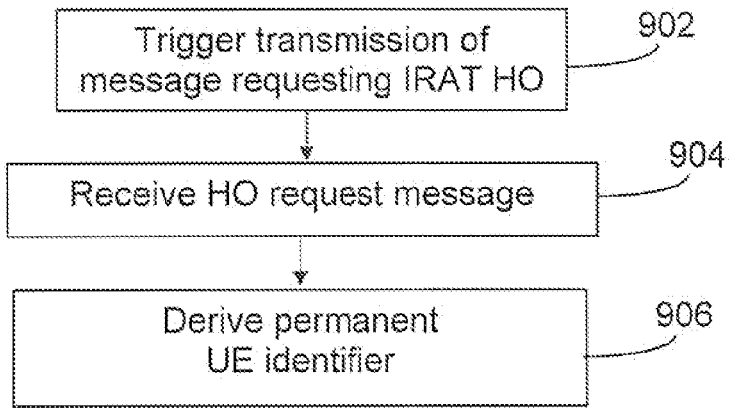
FIGS. 9-11 are flow charts illustrating the actions in procedures in a network node according to different exemplifying embodiments.
Figure 10:
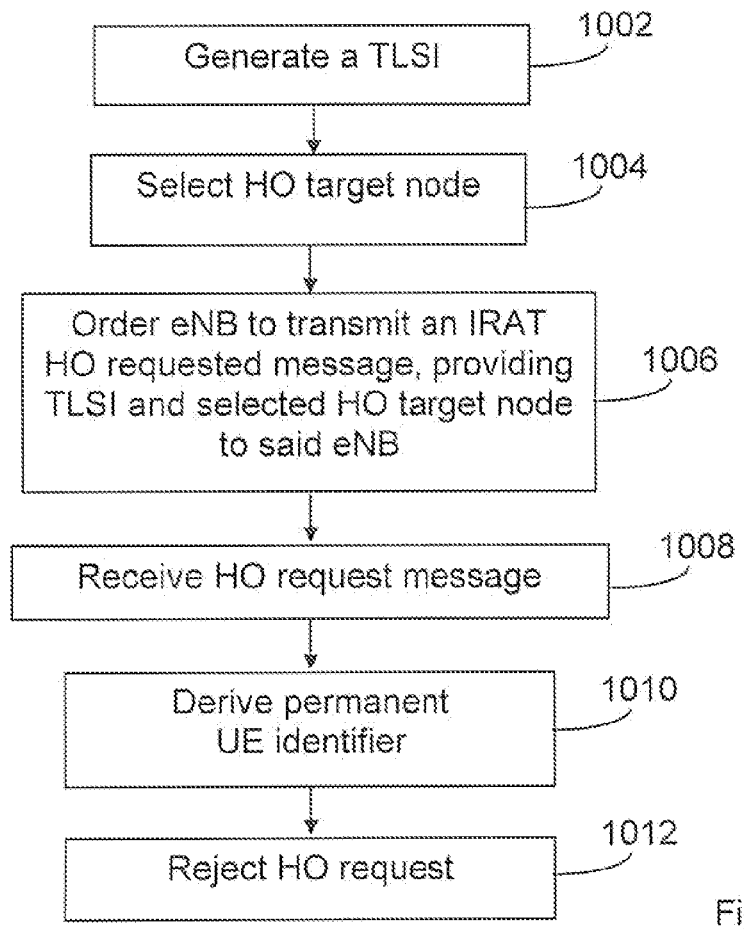
Figure 11:
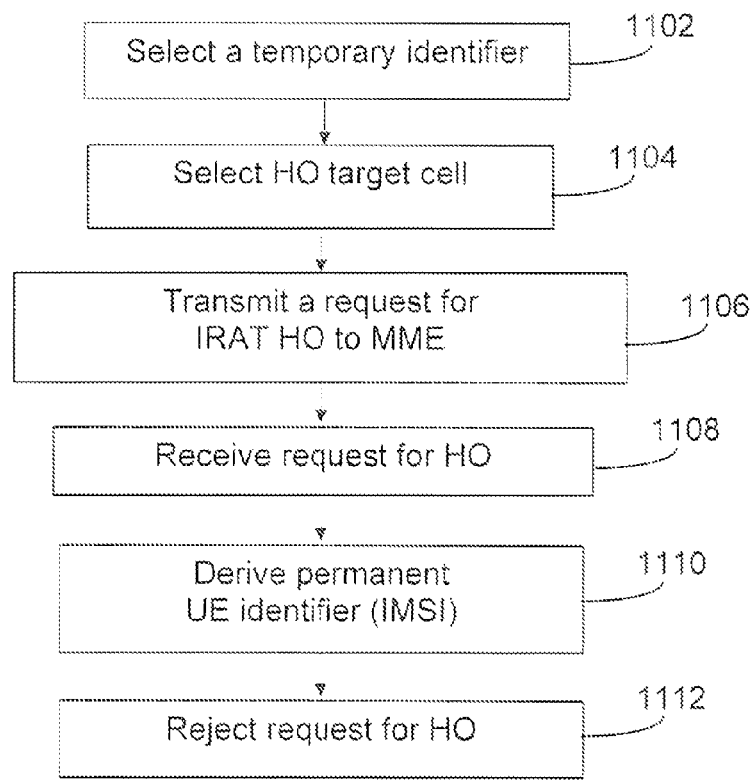

Exemplifying Procedure(s) in Network Node, FIGS. 9-11

Exemplifying embodiments of the procedure in a network node of deriving a permanent identifier for a UE in a cellular communication system of LTE type will be described below with reference to FIGS. 9-11.

FIG. 9 illustrates a generalized embodiment. In an action 902, transmission of a first message requesting an Inter-RAT handover is triggered. The first message should comprise a temporary identifier identifying a session in which the UE, of which a permanent identifier is to be derived, is active. The first message could be e.g. a so-called Handover Required message or a differently denoted message having the same function in handover preparation. The temporary identifier identifying a session in which the UE is active could, for example, be a TLSI created by the SA-RAN node/function or the S-TMSI of the UE could be used as the temporary identifier. Alternatively, another distinctive number or text string could be used as a temporary identifier.

Since the first message is a request for a handover, it further comprises an identifier of a handover target cell and/or node depending on the type of target RAN. For example, when an Inter-RAT handover is to be requested to a WCDMA/HSPA cell, it could be sufficient to include the target node identifier, as this enables routing the handover preparation signaling back to the network node (SA-RAN). For WCDMA/HSPA, this node identifier is called RNC-ID or Extended RNC-ID. However, the target WCDMA/HSPA cell identifier may also be included. For GSM, only a target cell identifier is used. The target cell identifier in GSM is called Cell Global Identity (CGI) and this information is enough to enable that the handover preparation signaling is routed back to the network node (SA-RAN).

In a preferred solution, the handover target cell and/or node is selected such that the Inter-RAT handover is requested to be performed towards the network node itself. For example, a dummy cell could be configured in the system, which dummy cell is associated with the network node. Then the dummy cell could be selected as handover target cell, and an identifier of the dummy cell could be included in the first message. Alternatively, the network node could comprise or be associated with e.g. an RNC or a BSC, and a target cell which is associated with this RNC or BSC could be selected.

Then, in response to or as a consequence of the triggered first message, a second message is received in an action 904.

It should be noted that the second message is not received as a direct response, i.e. directly from the node receiving the first message. The expression "in response to" could alternatively be changed to "as a consequence of" or "as a result of" (the transmission of the first message), or, the second message could be described as to be triggered by the first message. The second message could be a so-called Handover Request message or a differently denoted message used in handover preparation in a RAT, such as the PS-Handover Request message in GSM/GPRS/EDGE or the Relocation Request message in WCDMA/HSPA, and similar. The term second message could alternatively be changed to e.g. handover preparation request message or other suitable term.

In a preferred embodiment, the second message is received by the network node in its capacity of being, or being closely related to, the handover target node controlling the handover target cell.

The received second message comprises a permanent identifier, which could be an IMSI or similar. In LTE, the MME in the core network (where the IMSI is available) is configured to add the adequate IMSI to inter-RAT handover preparation messages according to standard. However, the IMSI is at present not added to intra-RAT handover preparation messages. The second message further comprises the temporary identifier identifying a session of the UE.

Then, a permanent identifier for the UE is derived in an action 906. The permanent identifier for the UE is derived by that an association is created between the session identified by the temporary identifier comprised in the second message, and the permanent identifier, also comprised in the second message. Thus, information related to the session may be linked to the IMSI, and thus be monitored, stored and/or retrieved, e.g. for use in user profiling, where the behavior of the user of the UE is tracked and analyzed. The actions and behavior of the user of the UE may thus be monitored and analyzed also as the user/UE moves across different RATs including LTE type RATs.

According to the described procedure, a permanent UE identifier can be obtained in RANs in cellular communication systems employing LTE type RATs without modifying any nodes or functions in the core network.

FIG. 10 illustrates actions of a more detailed exemplifying embodiment of the procedure, where the network node communicates with a base station, e.g. denoted eNB, in order to derive a permanent identifier for the UE. In this exemplifying embodiment, the temporary identifier associated with a session in which the UE is active is a TLSI, which is generated by the network node in an action 1002. Alternatively, some other indicator could be used as temporary identifier, such as e.g. the S-TMSI of the UE or some other distinctive number or text string.

A handover target cell is selected in an action 1004, such as e.g. a dummy cell, associated with the network node itself. An indication, e.g. an instruction or order message, is sent to a base station serving the UE in an action 1006, which triggers the base station to send a first message requesting an Inter-RAT handover for the UE. The indication comprises the temporary identifier and a target cell identifier and/or target node identifier as previously described, which temporary identifier and target cell identifier and/or target node identifier are also comprised in the first message. The actions 1008 and 1010 are similar to the actions 904, 906.

Further, in the embodiment illustrated in FIG. 10, the request for Inter-RAT handover is rejected in an action 1012. The feature of rejecting the request for Inter-RAT handover could be implemented in any embodiment, in order to prevent further (unnecessary) activity related to the requested handover. An example of activities which could be avoided is e.g. attempts to actually perform a handover to the target cell. This would be a waste of resources, since the purpose of requesting the handover is not to actually perform a handover, but to obtain a permanent identifier of a UE. The request for Inter-RAT handover could be rejected e.g. based on a certain handover cause comprised in the request, which handover cause indicates that the request for handover is related to derivation of a permanent UE identifier. The request for Inter-RAT handover could further be rejected with a certain reject cause, which indicates that the rejection is related to derivation of a permanent UE identifier, such that this type of handover rejections do not affect the statistics for regular handover rejections, which are based on other reasons, such as congestion.

FIG. 11 illustrates actions of an exemplifying embodiment of the procedure adapted to that the case where the interface between the base station (serving the UE) and the core node MME traverses via the network node, as is also illustrated in FIG. 7, such that the network node is able to e.g. insert a request for an Inter-RAT handover in the communication between the base station and the MME.

As in the previously described embodiment, a temporary identifier, e.g. a TLSI, is generated or selected in an action 1102, and a handover target cell is selected in an action 1104. Then, a request for an Inter-RAT handover is transmitted directly to the core node MME in an action 1106, i.e. without necessarily contacting the base station serving the UE. The following actions 1108-1112 are similar to the previously described actions for receiving the request for Inter-RAT handover in capacity of being, or being closely related to, the target node controlling the target cell; deriving a permanent UE identifier; and rejecting the request for Inter-RAT handover.

Figure 12A:
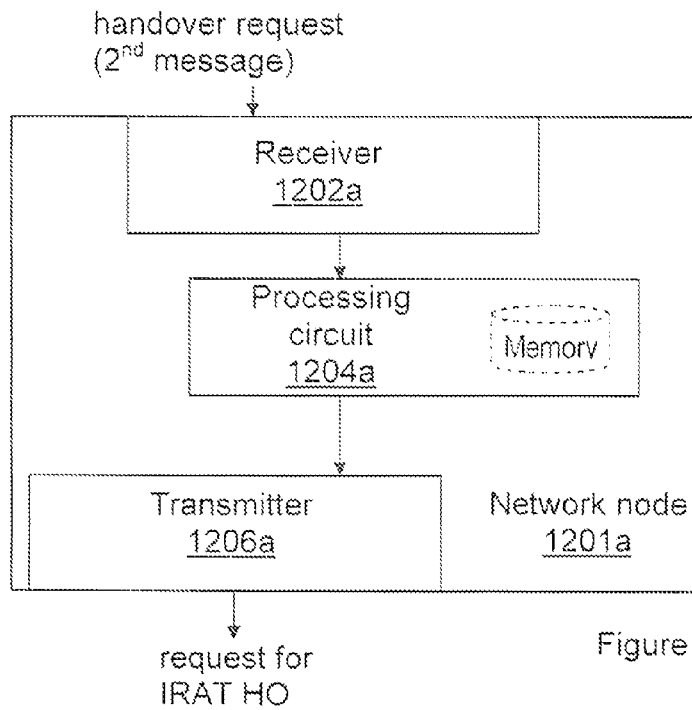
FIG. 12 is a block diagram illustrating a network node according to an exemplifying embodiment.

Exemplifying Network Node, FIG. 12a

Below, an example network node 1201a, adapted to enable the performance of the above described procedure(s) for deriving a permanent identifier for a UE in a cellular communication system of LTE type will be described with reference to FIG. 12a. The network node could be a separate node in the cellular communication network, or be jointly located with and/or integrated with another node in the radio access network, e.g. an RNC comprising a cache, or similar. The network node is assumed to be capable of, when appropriate, communicating via the interfaces S1-EVO, S1-MME, S1-U, Gb, Iu-PS, or differently named interfaces having similar functions.

The network node 1201a comprises a processing circuit 1204a and a receiver 1202a. The processing circuit 1204a is configured to trigger a transmission of a first message requesting an Inter-RAT, handover. The first message comprises a temporary identifier, such as e.g. a TLSI, identifying a session of the UE of which a permanent identifier is to be derived. The receiver 1202a is configured to receive a second message in response to the first message. The second message comprises a permanent identifier, e.g. an IMSI, and the temporary identifier identifying a session of the UE. The second message is a part of the same handover preparation as the first message, and thus relate to the request for an Inter-RAT handover.

The processing circuit 1204a is further configured to derive a permanent identifier for the UE by creating an association between the session identified by the temporary identifier, which is comprised in the second message, and the permanent identifier, which is itself comprised in the second message. The processing circuit could further be configured to reject the request for Inter-RAT handover, such that further activity related to the requested handover is prevented. The processing circuit could be configured e.g. to reject the request for Inter-RAT handover based on the detection of a special handover cause in the second message, which handover cause indicates that the request for handover is related to derivation of a permanent UE identifier; and/or to reject the request for Inter-RAT handover with a special reject cause, which reject cause indicates that the rejection is related to derivation of a permanent UE identifier.

The network node 1201a could further be configured to be able to perform any one or more of the actions described as part of a procedure for deriving a permanent identifier for a UE in this disclosure. For example, the network node could be configured to communicate with a base station serving the UE of which a permanent identifier is to be found, and to trigger, e.g. order or instruct, said base station to transmit a first message requesting an Inter-RAT handover for the UE to a core node having the function of an MME. Further, the network node could be configured to insert information into a communication between the base station and the core node, and thus be able to (itself) transmit the first message directly to the core node without involving the base station.

Figure 12B:
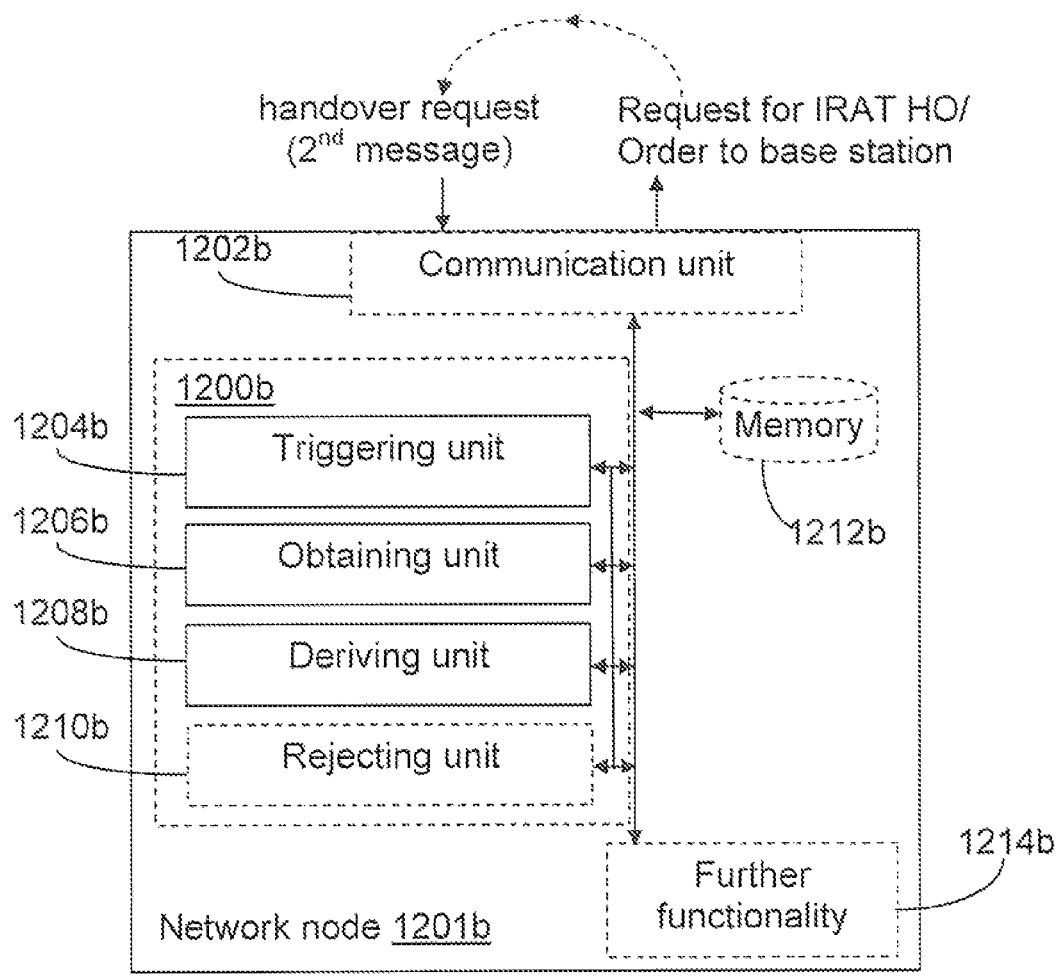

The network node 1201a could alternatively be implemented and illustrated as in FIG. 12b. The network node 1201b illustrated in FIG. 12b comprises a triggering unit 1204b, which is adapted to trigger a transmission of a first message requesting an Inter-RAT, handover. The network node 1201b further comprises an obtaining unit 1206b, which is adapted to receive a second message in response to the first message. The second message is a part of the same handover preparation as the first message, and thus relate to the request for an Inter-RAT handover. The obtaining unit 1206b could alternatively be a part of communication unit 1202b for communicating with other entities. The communication unit 1202b may also be considered to comprise means for wireless and/or wired communication.

The network node 1201b further comprises a deriving unit 1208b, which is adapted to derive a permanent identifier for the UE by creating an association between the session identified by the temporary identifier, which is comprised in the second message, and the permanent identifier, which is itself comprised in the second message. The network node 1201b could further comprise a rejecting unit 1210b, illustrated by a dashed line, adapted to reject the request for Inter-RAT handover, such that further activity related to the requested handover is prevented. The rejecting unit could be adapted e.g. to reject the request for Inter-RAT handover based on the detection of a special predefined handover cause in the second message, which handover cause indicates that the request for handover is related to derivation of a permanent UE identifier; and/or to reject the request for Inter-RAT handover with a special reject cause, which reject cause indicates that the rejection is related to derivation of a permanent UE identifier.

The network node 1201b could further be adapted to be able to perform any one or more of the actions described as part of a procedure for deriving a permanent identifier for a UE in this disclosure. For example, the network node could be adapted to communicate with a base station serving the UE of which a permanent identifier is to be found, and to trigger, e.g. order or instruct, said base station to transmit a first message requesting an Inter-RAT handover for the UE to a core node having the function of an MME. Further, the network node could be adapted to insert information into a communication between the base station and the core node, and thus be able to (itself) transmit the first message directly to the core node without involving the base station.

The parts of the network node 1201, which are especially adapted for the performance of the previously described procedure(s) are illustrated as an arrangement 1200b, surrounded by a dashed line.

The network node may further comprise e.g. other functional units 1214, such as e.g. functional units providing RNC and/or BSC functionality, and may further comprise one or more storage units 1212b.

The arrangement 1200b could be implemented e.g. by one or more of: a processor or a micro processor and adequate software, a Programmable Logic Device (PLD) or other electronic component(s)/processing circuit(s) configured to perform the actions mentioned above.

Figure 13:
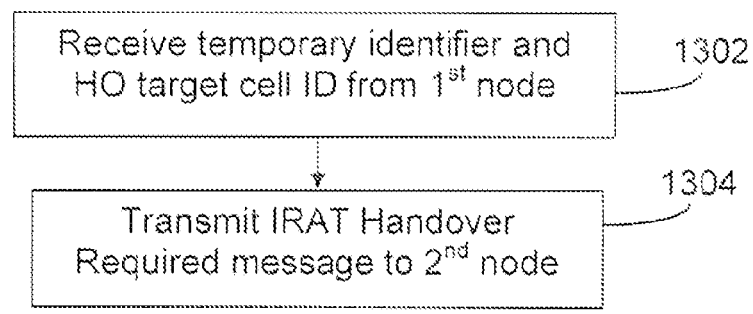
FIG. 13 is a flow chart illustrating the actions of a procedure in a base station according to an exemplifying embodiment.

Exemplifying Procedure Base Station, FIG. 13

Below an exemplifying embodiment of the procedure in a base station in a cellular communication system for supporting deriving of a permanent identifier for a UE being served by the base station, will be described with reference to FIG. 13.

Initially, an indication is received in an action 1302, the indication comprising a temporary identifier, such as a TLSI, identifying a session of the UE for which the deriving of a permanent identifier is supported. The indication may have the form of a message, and may be denoted "trigger". The indication further comprises an identity of a cell and/or node. As a reaction to the indication, or as a response to said indication, a first message is transmitted in an action 1304. The first message is a request for an Inter-RAT handover and should comprise the temporary identifier received in the indication, and the cell and/or node identity comprised in the indication, where the cell and/or node identity is to be used as indicator(s) of the target cell/node for the Inter-RAT handover. Further, a specific handover cause could be inserted in the first message, which could facilitate a future rejection of the handover request. The temporary identifier could be inserted in a so-called transparent container in the first message which enables the temporary identifier to propagate unmodified into the second message.

Figure 14A:
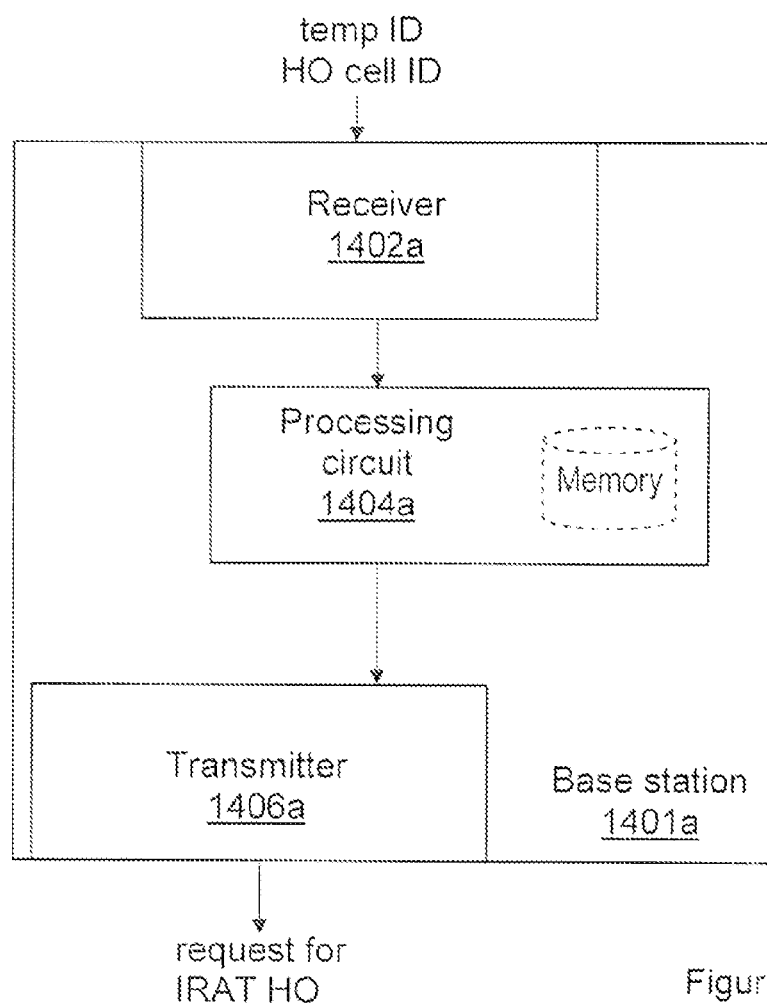
FIG. 14 is a block diagram illustrating a base station according to an exemplifying embodiment.

Exemplifying Base Station, FIG. 14a

Below, an example base station 1401a, adapted to enable the performance of the above described procedure for supporting deriving a permanent identifier for a UE in a cellular communication system will be described with reference to FIG. 14a. The base station is assumed to be a base station suitable for use in a RAT according to which no permanent UE identifier is normally available in the RAN, such as e.g. an eNB in a RAT of LTE type. The base station is assumed to be capable of, when appropriate, communicating e.g. via the interfaces S1-EVO, LTE-Uu, S1-MME and S1-U, or differently named interfaces having similar functions.

The base station 1401 comprises a receiver 1402a and a processing circuit 1404a. The receiver 1402a is configured to receive an indication, e.g. in form of a message, comprising a temporary identifier, such as a TLSI, identifying a session of the UE. Further, the processing circuit 1404a is configured to transmit, in response to said indication, a first message requesting an Inter-RAT handover, said first message comprising the temporary identifier. The processing circuit may further be configured to include an identity of a cell and/or node, which identity was comprised in the received indication, in the first message as indicator of the target cell for the requested Inter-RAT handover The base station 1401a could alternatively be implemented and illustrated as in FIG. 14b. The base station

Figure 14B:
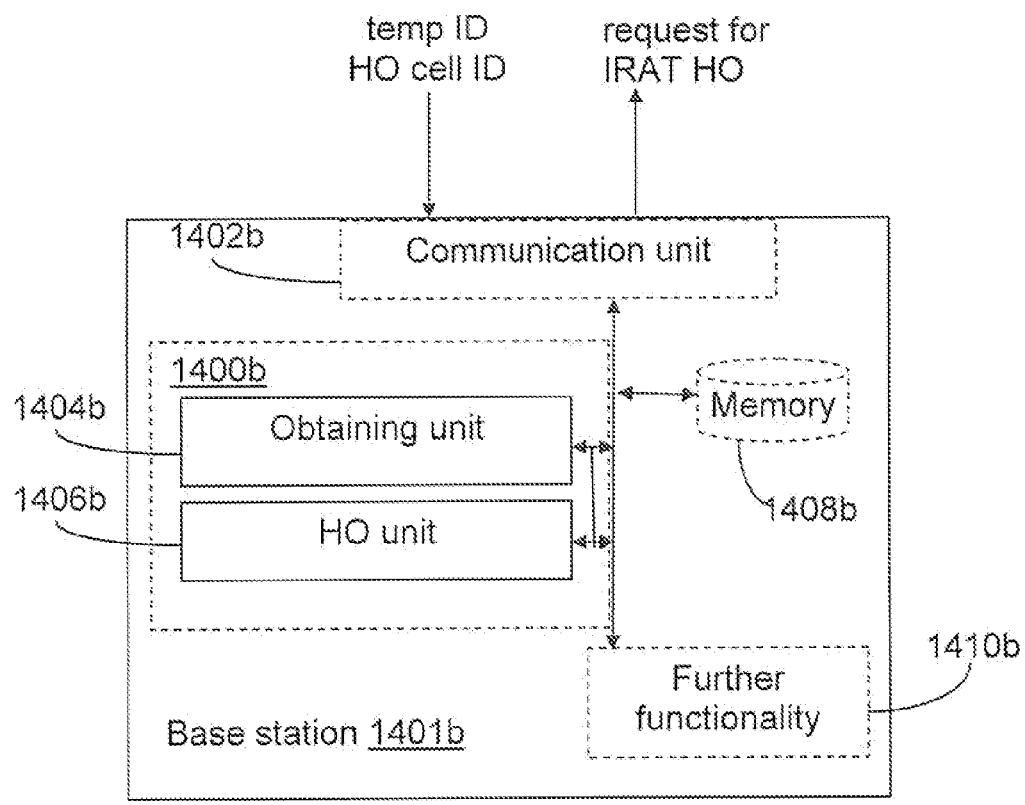

1401b, illustrated in FIG. 14b comprises an obtaining unit 1404b, which is adapted to receive an indication, e.g. in form of a message, comprising a temporary identifier, such as a TLSI, identifying a session of the UE. The obtaining unit 1404b could alternatively be a part of communication unit 1402b for communicating with other entities. The communication unit 1402b may also be considered to comprise means for wireless and/or wired communication.

The base station 1401b further comprises a handover unit 1406b, which is adapted to transmit, in response to said indication, a first message requesting an Inter-RAT handover, said first message comprising the temporary identifier, and the identity of a handover target cell and/or node. The base station may further be adapted to insert a certain handover cause in the first message, and/or to insert the temporary identifier in a so-called transparent container in the first message.

The base station 1401b could further be adapted to cancel the requested Inter-RAT handover, e.g. if the request is not rejected by the target node.

The parts of the base station 1401b, which are especially adapted for the performance of the previously described procedure(s) are illustrated as an arrangement 1400b, surrounded by a dashed line. The base station 1401a may further comprise other functional units 1410, such as e.g. functional units providing regular base station functionality, and may further comprise one or more storage units 1408b.

The arrangement 1400b could be implemented e.g. by one or more of: a processor or a micro processor and adequate software stored in a memory, a Programmable Logic Device (PLD) or other electronic component(s)/processing circuit(s) configured to perform the actions mentioned above.
Exemplifying Arrangement, FIG. 15

Figure 15:
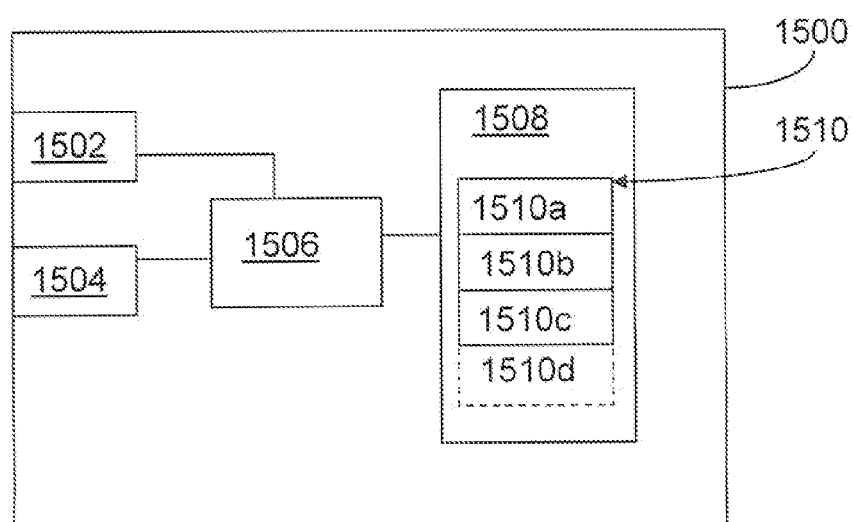
FIG. 15 is a block diagram illustrating an arrangement in a node according to an exemplifying embodiment.

FIG. 15 schematically shows an embodiment of an arrangement 1500 in a network node, which also can be an alternative way of disclosing an embodiment of the arrangement in a network node illustrated in FIG. 12. Comprised in the arrangement 1500 are here a processing unit 1506, e.g. with a DSP (Digital Signal Processor). The processing unit 1506 may be a single unit or a plurality of units to perform different actions of procedures described herein. The arrangement 1500 may also comprise an input unit 1502 for receiving signals from other entities, and an output unit 1504 for providing signal(s) to other entities. The input unit 1502 and the output unit 1504 may be arranged as an integrated entity.

Furthermore, the arrangement 1500 comprises at least one computer program product 1508 in the form of a non-volatile memory, e.g. an EEPROM (Electrically Erasable Programmable Read-Only Memory), a flash memory and a hard drive. The computer program product 1508 comprises a computer program 1510, which comprises code means, which when executed in the processing unit 1506 in the arrangement 1500 causes the arrangement and/or the network node to perform the actions e.g. of the procedure described earlier in conjunction with FIG. 9.

The computer program 1510 may be configured as a computer program code structured in computer program modules. Hence, in an exemplifying embodiment, the code means in the computer program 1510 of the arrangement 1500 comprises a triggering module 1510a for triggering transmission of a first message. The computer program further comprises an obtaining module 1510b for receiving a second message in response to the first message. The computer program 1510 further comprises a deriving module 1510c for deriving a permanent identifier for a UE based on information comprised in the second message. The computer program 1510 could further comprise other modules, such as a rejecting module 1510d for providing other desired functionality.

The modules 1510a-c could essentially perform the actions of the flow illustrated in FIG. 9, to emulate the arrangement in a network node illustrated in FIG. 12. In other words, when the different modules 1510a-c are executed in the processing unit 1506, they may correspond to the units 1204-1208 of FIG. 12.

Although the code means in the embodiment disclosed above in conjunction with FIG. 15 are implemented as computer program modules which when executed in the processing unit causes the arrangement and/or network node to perform the actions described above in the conjunction with figures mentioned above, at least one of the code means may in alternative embodiments be implemented at least partly as hardware circuits.

The processor may be a single CPU (Central processing unit), but could also comprise two or more processing units. For example, the processor may include general purpose microprocessors; instruction set processors and/or related chips sets and/or special purpose microprocessors such as ASICs (Application Specific Integrated Circuit). The processor may also comprise board memory for caching purposes. The computer program may be carried by a computer program product connected to the processor. The computer program product may comprise a computer readable medium on which the computer program is stored. For example, the computer program product may be a flash memory, a RAM (Random-access memory) ROM (Read-Only Memory) or an EEPROM, and the computer program modules described above could in alternative embodiments be distributed on different computer program products in the form of memories within the network node.

In a similar manner, an exemplifying embodiment comprising computer program modules could be described for the arrangement in a base station illustrated in FIG. 14.

It is to be understood that the choice of interacting units or modules, as well as the naming of the units are only for exemplifying purpose, and nodes suitable to execute any of the methods described above may be configured in a plurality of alternative ways in order to be able to execute the suggested process actions.

It should also be noted that the units or modules described in this disclosure are to be regarded as logical entities and not with necessity as separate physical entities.

ABBREVIATIONS

CN Core Network
EDGE Enhanced Data rates for GSM Evolution
GPRS General Packet Radio Service
GSM Global System for Mobile Communications
HSPA High Speed Packet Access
IMSI International Mobile Subscriber Identity
IP Internet Protocol
LI Legal (or Lawful) Intercept
LTE Long Term Evolution
PDN-GW Packet Data Network Gateway
RAN Radio Access Network
RAT Radio Access Technology
SA-RAN Service Aware RAN
SGSN Serving GPRS Support Node
S-GW Serving Gateway
TLSI Temporary LTE Session Identifier
UE User Equipment
WCDMA Wideband Code Division Multiple Access

The invention claimed is:

1. A method in a network node of a Radio Access Network (RAN) of a cellular communication system of LTE type for deriving a permanent identifier for a User Equipment, UE, in said cellular communication system, said method comprising:
   triggering a transmission of a first message, requesting an Inter-Radio Access Technology, Inter-RAT, handover, said first message comprising a temporary identifier, identifying a session of the UE;
   receiving a second message in response to the first message, said second message comprising a permanent identifier, and the temporary identifier identifying a session of the UE; and
   deriving a permanent identifier for the UE by creating an association between the session identified by the temporary identifier and the permanent identifier, comprised in the second message.

2. The method according to claim 1, wherein the first message further comprises an identifier of a handover target cell and/or node, selected such that the Inter-RAT handover is requested to be performed towards an entity associated with the network node itself.

3. The method according to claim 1, wherein the permanent identifier is the International Mobile Subscriber Identity, IMSI, of the UE.

4. The method according to claim 1, wherein the temporary identifier is a Temporary LTE Session Identifier, TLSI.

5. The method according to claim 1, wherein the target cell for the requested handover is a dummy cell, which is configured in the cellular communication system, which dummy cell is associated with the network node.

6. The method according to claim 1, further comprising rejecting the request for Inter-RAT handover, such that further activity related to the requested handover is prevented.

7. The method according to claim 6, wherein the rejecting involves at least one of: rejecting the request for Inter-RAT handover based on detection of a special predefined handover cause in the second message, rejecting with a special reject cause.

8. The method according to claim 1, wherein the temporary identifier is comprised in a Transparent Container in the first and second message.

9. The method according to claim 1, wherein the first message is transmitted by the network node.

10. The method according to claim 1, wherein the triggering of a transmission of the first message involves ordering a base station serving the UE to transmit the first message.

11. The method according to claim 1, wherein the UE is active in a communication system of LTE type and served by an eNB.

12. A network node of a Radio Access Network (RAN) of a cellular communication system of LTE type for deriving a permanent identifier for a User Equipment, UE, in said cellular communication system, said network node comprising:
   a processing circuit; and
   a receiver;
      wherein said processing circuit is configured to trigger a transmission of a first message requesting an Inter-Radio Access Technology, Inter-RAT, handover, said first message comprising a temporary identifier, identifying a session of the UE;
      wherein said receiver is configured to receive a second message in response to the first message, said second message comprising a permanent identifier, and the temporary identifier identifying a session of the UE; and
      wherein said processing circuit is further configured to derive a permanent identifier for the UE by creating an association between the session identified by the temporary identifier and the permanent identifier comprised in the second message.

13. The network node according to claim 12, wherein the processing circuit is further configured to select a target cell for the requested Inter-RAT handover, such that the Inter-RAT handover is requested to be performed towards an entity associated with the network node itself.

14. The network node according to claim 13, wherein the processing circuit is further configured to select a dummy cell as target cell for the requested handover, which dummy cell is associated with the network node.

15. The network node according to claim 12, wherein the permanent identifier is the International Mobile Subscriber Identity, IMSI, of the UE.

16. The network node according to claim 12, wherein the processing circuit is further configured to generate a Temporary LTE Session Identifier, TLSI, for use as the temporary identifier.

17. The network node according to claim 12, wherein the processing circuit is further configured to reject the request for Inter-RAT handover, such that further activity related to the requested handover is prevented.

18. The network node according to claim 17, wherein the processing circuit is further configured to at least one of: reject the request for Inter-RAT handover based on detection of a special predefined handover cause in the second message reject the request for Inter-RAT handover with a special reject cause.

19. The network node according to claim 12, wherein the temporary identifier is comprised in a Transparent Container in the first and second message.

20. The network node according to claim 12, wherein the processing circuit is configured to transmit the first message.

21. The network node according to claim 12, wherein the processing circuit is further configured to trigger transmission of the first message by ordering a base station serving the UE to transmit the first message.

* * * * *